United States Patent
Kawadu et al.

(10) Patent No.: US 9,151,245 B2
(45) Date of Patent: Oct. 6, 2015

(54) PULSE ROCKET MOTOR INCLUDING A DIVIDING SHEET FOR SEPARATING THE FIRST GRAIN PROPELLANT FROM THE SECOND GRAIN PROPELLANT

(75) Inventors: Hiroyuki Kawadu, Tokyo (JP); Ichiro Yamaguchi, Tokyo (JP); Shuji Hagiwara, Tomoika (JP); Shoji Endo, Tokyo (JP); Tokuichiro Ojima, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 660 days.

(21) Appl. No.: 13/529,836

(22) Filed: Jun. 21, 2012

(65) Prior Publication Data
US 2013/0111874 A1   May 9, 2013

(30) Foreign Application Priority Data

Jun. 24, 2011 (JP) .................................. 2011-140395
Jan. 5, 2012 (JP) .................................. 2012-000634

(51) Int. Cl.
*F02K 9/08* (2006.01)
*F02K 9/28* (2006.01)
*F02K 9/32* (2006.01)
*F02K 9/36* (2006.01)

(52) U.S. Cl.
CPC ... *F02K 9/08* (2013.01); *F02K 9/28* (2013.01); *F02K 9/32* (2013.01); *F02K 9/36* (2013.01)

(58) Field of Classification Search
CPC ............... F02K 9/08; F02K 9/12; F02K 9/28; F02K 9/32; F02K 9/36; F02K 9/34; F02K 9/343; F02K 9/346

USPC ...................... 60/253, 254, 255, 256
See application file for complete search history.

(56) References Cited

U.S. PATENT DOCUMENTS

| 3,712,058 A * | 1/1973 | Cooper ........................... 60/207 |
| 3,724,217 A * | 4/1973 | McDonald ...................... 60/254 |
| 4,223,606 A * | 9/1980 | Bornstein ...................... 102/374 |
| 5,600,946 A * | 2/1997 | Dombrowski et al. .......... 60/253 |
| 8,397,486 B2 * | 3/2013 | Mihara et al. ................... 60/253 |
| 2010/0218481 A1 * | 9/2010 | Mihara et al. ................... 60/247 |
| 2011/0277446 A1 * | 11/2011 | Stroud et al. .................... 60/204 |
| 2012/0311993 A1 * | 12/2012 | Mihara et al. ................... 60/247 |
| 2013/0014491 A1 * | 1/2013 | Suzuki et al. ................... 60/250 |

FOREIGN PATENT DOCUMENTS

JP    11-503802    3/1999
WO   WO-95/30084 A1   11/1995

* cited by examiner

*Primary Examiner* — William H Rodriguez
(74) *Attorney, Agent, or Firm* — Marshall, Gerstein & Borun LLP

(57) ABSTRACT

A pulse rocket motor has a hollow cylinder-like first grain situated in a rear section of a pressure vessel; a first igniter for igniting the first grain; a hollow cylinder-like second grain situated in a front section of the pressure vessel; a second igniter for igniting the second grain; and a dividing sheet member that covers the second grain within the pressure vessel. The dividing sheet member includes a dividing sheet expanding at least along the inner circumferential surface of the second grain and holders formed integrally with the dividing sheet at both ends of the dividing sheet by cure adhesion and attached to the pressure vessel. The dividing sheet includes a brittle portion that expands along the inner circumferential surface of the second grain through a rear end face of the second grain and is more brittle than other portions.

8 Claims, 10 Drawing Sheets

PULSE ROCKET MOTOR INCLUDING A DIVIDING SHEET FOR SEPARATING THE FIRST GRAIN PROPELLANT FROM THE SECOND GRAIN PROPELLANT

BACKGROUND OF THE INVENTION

1. Field of the Invention

The invention relates to a pulse rocket motor with a plurality of solid fuels.

2. Description of the Related Art

A pulse rocket motor has a configuration in which two or more grains are placed in a single pressure vessel so as to be separated from each other by a dividing sheet or wall. This provides the advantage that combustion timing can be differentiated in a solid fuel rocket in which fuel combustion is not easy to stop and restart.

More specifically, a dual pulse rocket motor has been developed, in which a Pulse 1 grain (first grain) is situated in the rear section of a pressure vessel made of a carbon fiber and epoxy resin composition according to the Filament Winding method; a Pulse 2 grain (second grain) in the front section of the pressure vessel; and a barrier insulator (dividing sheet) is disposed between these grains (International Publication No. WO95/30084).

In the dual pulse rocket motor disclosed in International Publication No. WO95/30084, a fore insulator is situated between the pressure vessel and the Pulse 2 grain, and an aft insulator between the pressure vessel and the Pulse 1 grain. The fore, aft and barrier insulators are synthetic rubber made of EPDM (ethylene propylene diene monomer). These insulators are partially overlapped and adhered to each other.

According to the method of producing the dual pulse rocket motor described in International Publication No. WO95/30084, components are placed in order from before backwards. First of all, the fore insulator is placed in the inner surface of the pressure vessel, and the Pulse 2 grain is casted and hardened under vacuum. Secondly, the barrier insulator is attached to the Pulse 2 grain and the fore insulator, and the fore insulator is cut off. The aft insulator is attached to the barrier insulator, and the Pulse 1 grain (first grain) is injected and hardened. The insulators have inner surfaces covered with adhesive liners, which are adhered to their respective grains.

To produce the pressure vessel disclosed in International Publication No. WO95/30084, the carbon fiber and epoxy resin composition is molded directly around the grains according to the Filament Winding method. Pressure vessels thus made from resin have lower rigidity than those made from metal. Furthermore, the production method that molds a pressure vessel directly around grains requires the process of covering the fore, aft and barrier insulators with adhesive liners and thus bonding the insulators to the grains, which complicates the production process.

During the combustion of the Pulse 1 grain, the barrier insulator separating the Pulse 1 grain from the Pulse 2 grain is required to prevent flame from being transferred to the Pulse 2 grain. Due to aging degradation, however, there is the possibility that the barrier insulator and the fore insulator are detached from each other in their adhered region, and thus that the barrier insulator fails to prevent the flame transfer.

During the combustion of the Pulse 2 grain, it is also required that the barrier insulator should be broken at a certain position but never fall in order to prevent the barrier insulator from falling and blocking a nozzle. In this respect, International Publication No. WO95/30084 suggests breaking the barrier insulator in the adhered region between the fore insulator and the barrier insulator. It is not easy, however, to break the barrier insulator with proper timing because the setting of breaking strength by adhesion is difficult. Since the insulators are adhered to the grains, the barrier insulator is constrained from being detached from the grain at the time of the combustion of the Pulse 2 grain, which is a problem from the viewpoint of unfailing working.

The invention has been made to solve the foregoing problem. It is an object of the invention to provide a pulse rocket motor that surely prevents flame from being transferred to a second grain at the time of first pulse and reliably carries out second pulse with a simple configuration.

SUMMARY OF THE INVENTION

An aspect of the present invention is directed to a pulse rocket motor including a first grain having a hollow cylinder-like shape and situated in a rear section of a pressure vessel; a first igniter that ignites the first grain; a second grain having a hollow cylinder-like shape and situated in a front section of the pressure vessel; a second igniter that ignites the second grain; and a dividing sheet member that covers the second grain within the pressure vessel. The dividing sheet member has a dividing sheet expanding at least along an inner circumferential surface of the second grain; and holders formed integrally with the dividing sheet at both ends of the dividing sheet by cure adhesion and attached to the pressure vessel. The dividing sheet includes a brittle portion that expands along the inner circumferential surface of the second grain through a rear end face of the second grain and is more brittle than other portions.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the invention will be described below with reference to the attached drawings.

Figure 1:
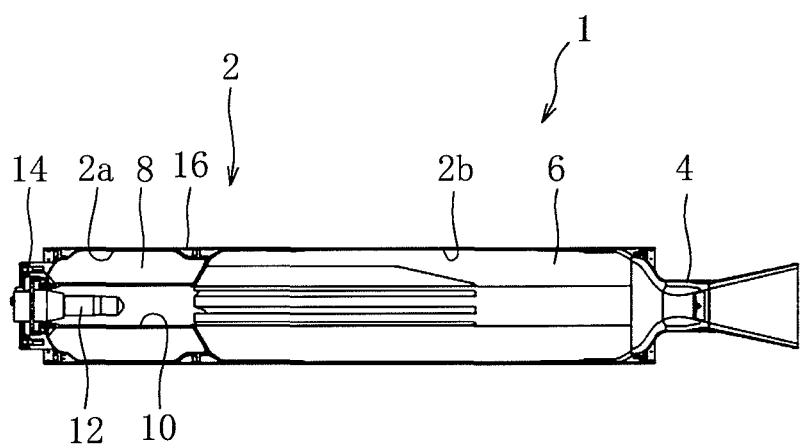
FIG. 1 is a sectional view of the entire configuration of a pulse rocket motor according to a first embodiment.
Figure 2:
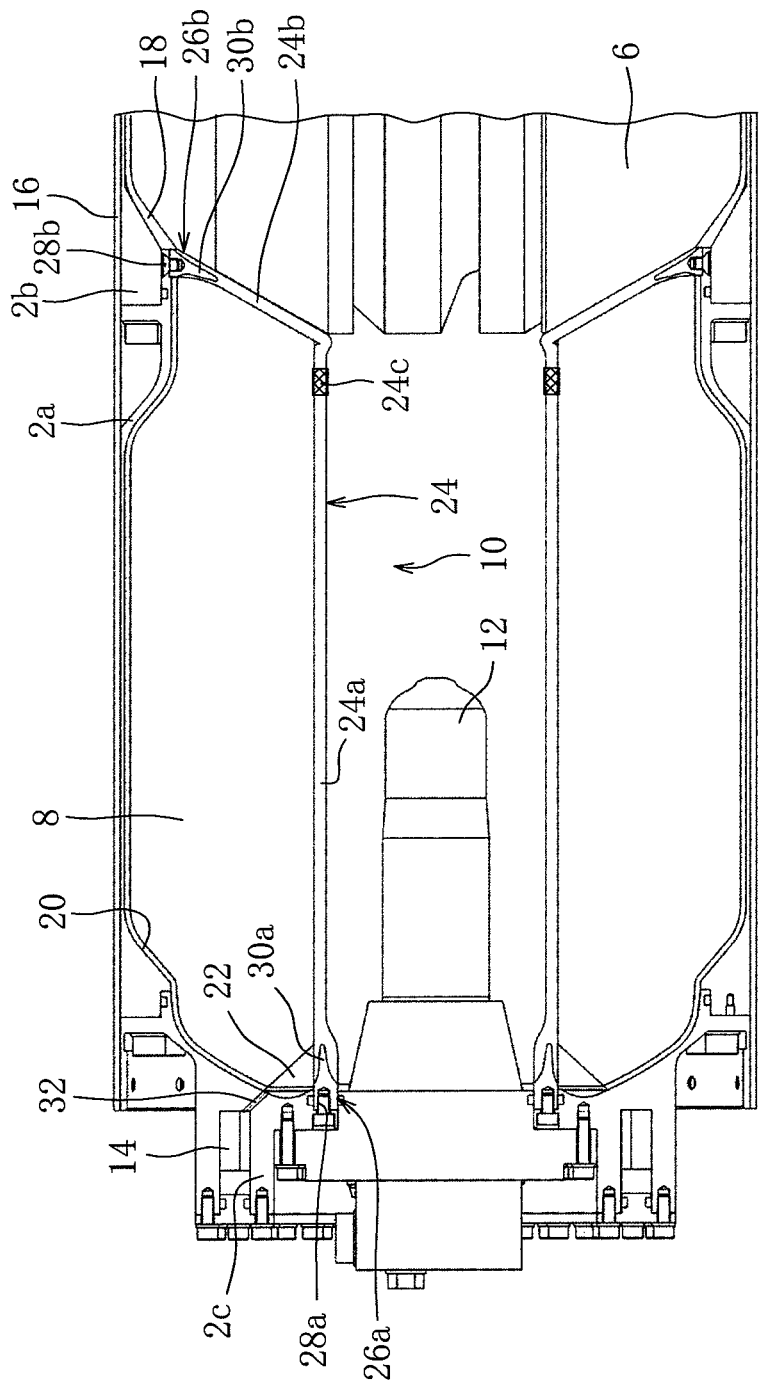
FIG. 2 is an enlarged sectional view of a main section shown in FIG. 1.
Figure 3:
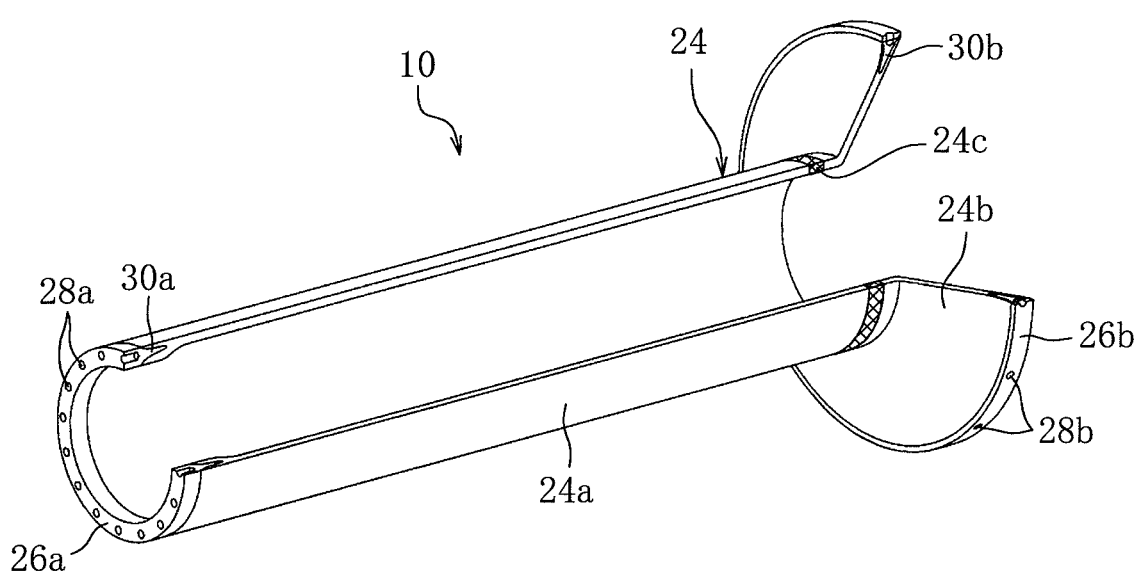
FIG. 3 is a perspective view of a dividing sheet member partially broken away.
Figure 4:
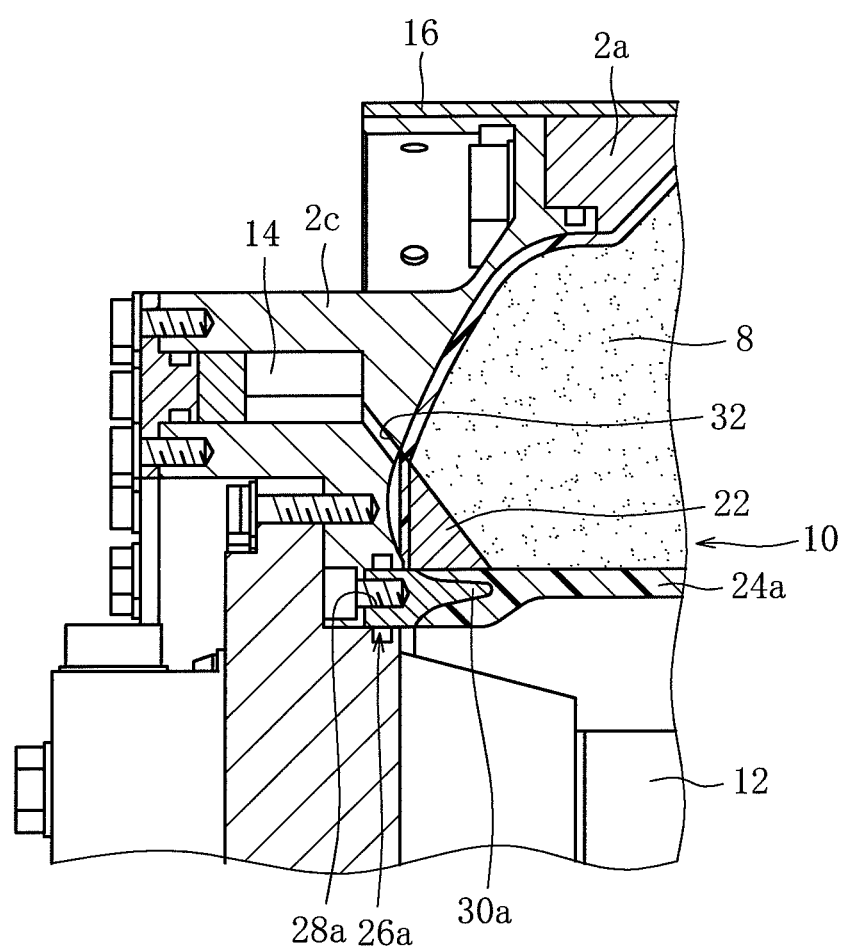
FIG. 4 is an enlarged sectional view of a front section shown in FIG. 2.
Figure 5:
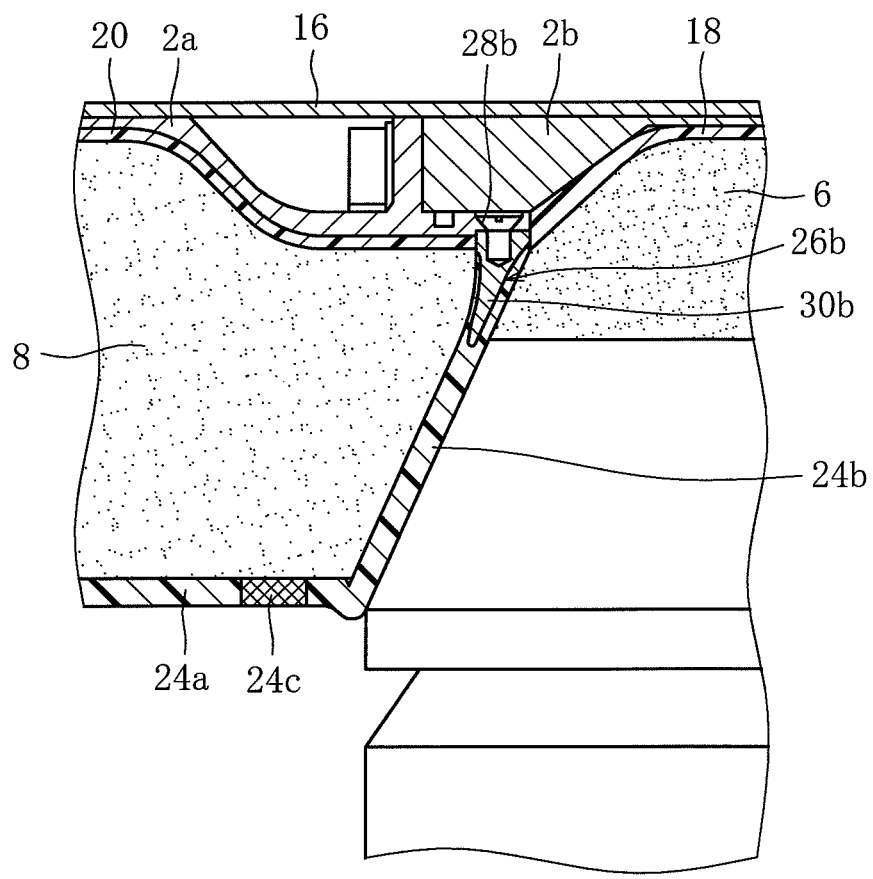
FIG. 5 is an enlarged sectional view of a rear section shown in FIG. 2.
Figure 6A:
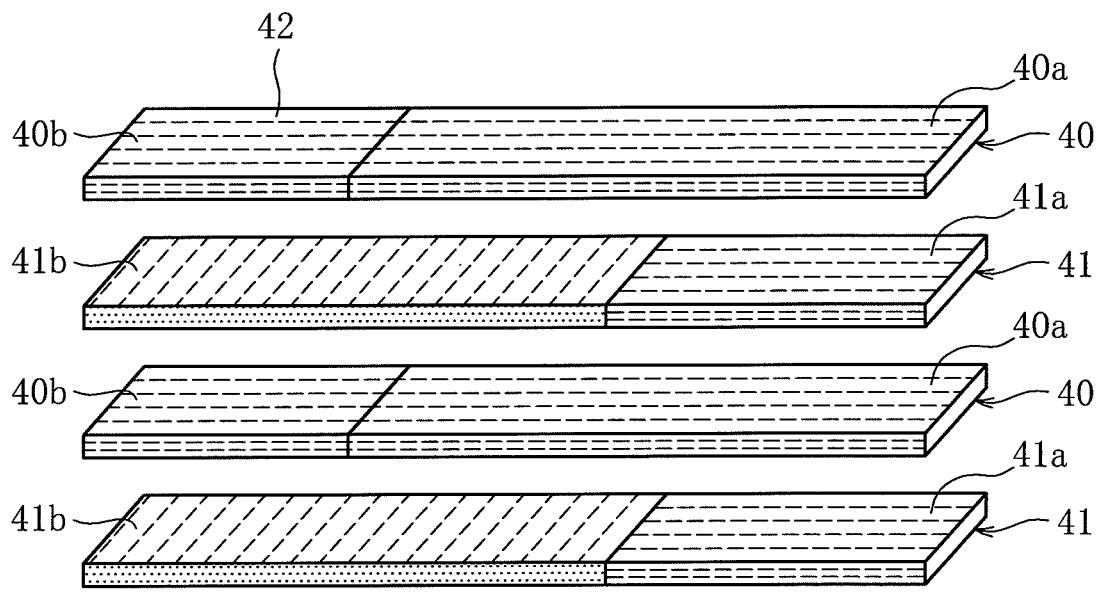
FIG. 6A is a fragmentary sectional view showing a configuration of a brittle portion of the dividing sheet arranged in the pulse rocket motor according to the first embodiment.
Figure 6B:
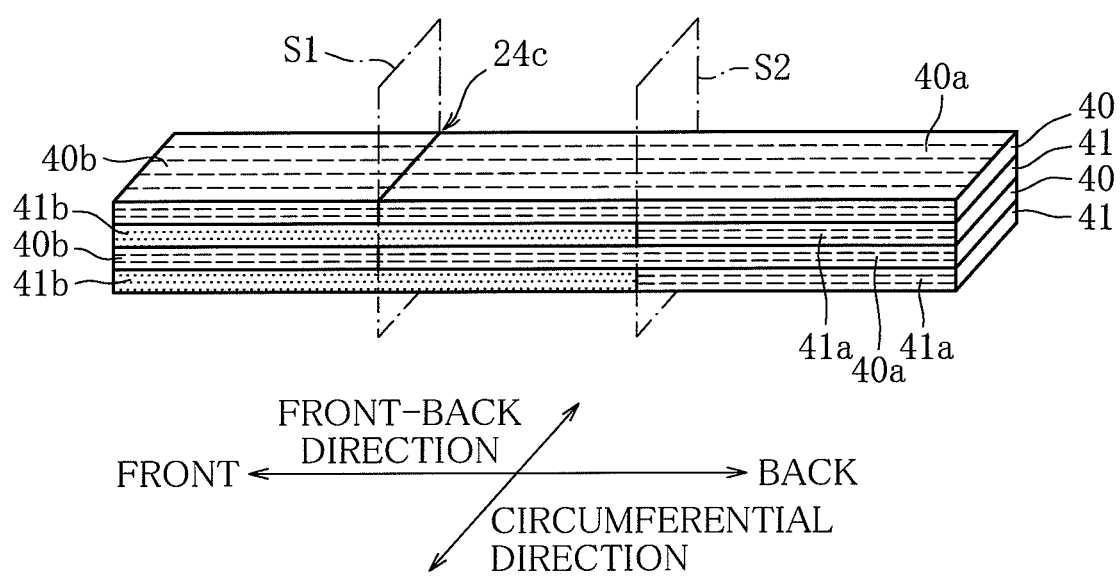
FIG. 6B is a fragmentary sectional view showing in a layered state the configuration of the brittle portion of the dividing sheet arranged in the pulse rocket motor according to the first embodiment.

FIG. 1 is a sectional view of the entire configuration of a pulse rocket motor according to a first embodiment. FIG. 2 is an enlarged sectional view showing a main section. FIG. 3 is a perspective view of a dividing sheet member partially broken away. FIG. 4 is an enlarged sectional view of a front section of FIG. 2. FIG. 5 is an enlarged sectional view of a rear section of FIG. 2. FIGS. 6A and 6B are fragmentary sectional views showing a configuration of a brittle portion of a dividing sheet.

A dual pulse rocket motor 1 shown FIG. 1 has a nozzle 4 arranged in a rear section of a pressure vessel 2. Inside the dual pulse rocket motor 1, a first grain 6 and a second grain 8 serving as solid fuel are arranged in rear and front sections, respectively. The second grain 8 is covered with a dividing sheet member 10. Attached to a front section of the pressure vessel 2 are a first igniter 12 for igniting the first grain 6 and a second igniter 14 for igniting a second grain 8.

More specifically, the pressure vessel 2 is a bi-split metal motor case and is formed of front and rear cases 2a and 2b substantially in the shape of cylinders of the same diameter and coaxially jointed together. The front and rear cases 2a and 2b are jointed together by fastening a rear-end opening edge of the front case 2a to a front-end opening edge of the rear case 2b with a plurality of bolts. Preferably, the pressure vessel 2 is made of titanium, maraging steel, D6AC steel, chrome molybdenum steel or the like. The outer periphery of the pressure vessel 2 is covered with an external insulator 16.

The first grain 6 is a grain for first pulse, which is burned first, and has the shape of a hollow cylinder extending in a front-back direction. The first grain 6 is situated in the rear case 2b with a rear thermal insulating material 18 there between. The first grain 6 includes a portion extending between the center thereof and the front end thereof in the front-back direction, which have an internal bore whose cross-sectional shape is a star polygon with a plurality of vertices so that combustion area is enlarged. The internal bore leads to the outside through the nozzle 4. The first grain 6 is a composite grain. The internal bore of the first grain may have a cross-section in the shape of a circle or may have a cross-section in the shape of a star polygon with vertices or the like in a portion extending between the center and the rear end thereof in the front-back direction or in another arbitrary portion.

The second grain 8 is a grain for second pulse, which is later burned, and has the shape of a hollow cylinder extending in the front-back direction. As particularly shown in FIG. 2, the second grain 8 is situated in the front case 2a with a front thermal insulating material 20 there between. The second grain 8 includes an internal bore having a circular cross-section and leading to the internal bore of the first grain 6 through the dividing sheet member 10. The second grain 8 is a composite grain.

An axial portion of the front section of the second grain 8 is cut away in a conical shape pointing rearwards. The cut-away area is filled with a grain holder 22. The grain holder 22 has lower density than the second grain 8 and is made of easily-burned material, such as foam material.

The dividing sheet member 10 includes a dividing sheet 24 made of thermal-insulating EPDM rubber, which is attached to the pressure vessel 2 with dividing sheet clamps 26a and 26b (holders) fixed to both respective ends of the dividing sheet member 10.

As shown in FIGS. 2 and 3, the dividing sheet 24 has a substantially funnel-like shape including an inner face 24a expanding in the front-back direction along an inner circumferential surface of the internal bore of the second grain 8 to be formed in a cylindrical shape and an end face 24b expanding from a rear end of the inner face 24a at a slant in a radially outward direction.

The dividing sheet clamps 26a and 26b have a ring-like shape. A plurality of bolt holes 28a and 28b are formed in a front face of the dividing sheet clamp 26a located near the front end and in an outer circumferential surface of the dividing sheet clamp 26b located near the rear end at intervals along a circumferential direction. The dividing sheet member 10 is fastened to the pressure vessel 2 with bolts screwed into the bolt holes 28a and 28b. Preferably, the dividing sheet clamps 26a and 26b are metal from the viewpoint of airtightness and heat resistance. However, the dividing sheet clamps 26a and 26b may be made of Fiber Reinforced Plastics (FRP) or the like as long as they are as airtight and heat-resistant as when being made of metal.

An attachment structure of the dividing sheet 24 and the dividing sheet clamps 26a and 26b will be explained below in further details with reference to FIGS. 4 and 5.

As shown in FIG. 4, the dividing sheet clamp 26a located near the front end is provided in a ring-like rear face with a convex portion 30 having a convex cross-section tapered rearwards. The convex portion 30a is located inside the front end portion of the inner face 24a of the dividing sheet expanding in the front-back direction. The convex portion 30a and the inner face 24a of the dividing sheet are integrally combined together by cure adhesion. The tip end of the convex portion 30a of the dividing sheet clamp 26a located near the front end coincides with a rear end of the grain holder 22 as viewed in the front-back direction. The convex portion 30a extends over a range of the grain holder 22.

As shown in FIG. 5, a convex portion 30b having a convex cross-section tapered inwards is formed in the ring-like inner surface of the dividing sheet clamp 26b located near the rear end. The convex portion 30b is located inside the rear end portion of the end face 24b of the dividing sheet expanding in the radial direction. The convex portion 30b and the end face 24b of the dividing sheet are integrally combined together by cure adhesion. The end face 24b is in direct contact with the first grain 6 and the second grain 8 to separate the first grain 6 from the second grain 8.

The dividing sheet 24 will be described below in details.

As shown in FIGS. 2, 3 and 5, in the dividing sheet 24, a brittle portion 24c that is structurally more brittle than other portions is formed near a curved portion between the inner face 24a and the end face 24b. The brittle portion 24c is previously designed to have such strength as to be broken when receiving a combustion pressure equal to or higher than a predetermined value.

FIGS. 6A and 6B are fragmentary views showing a configuration of the brittle portion 24c in the dividing sheet 24. The dividing sheet 24 made of EPDM is formed of a rubber layered body that is obtained by stacking a plurality of rubber plates in layers in a thick direction. The rubber plates are formed by mixing short fibers (such as aramid fiber) into crude rubber and compressing the result with a roller. The fibers mixed in the rubber plates form lines in a grain direction that the fibers are compressed by the roller. FIGS. 6A and 6B show the direction of alignment of fibers 42 in the rubber plates, namely, grain direction by broken lines for simplicity.

As shown in FIGS. 6A and 6B, the dividing sheet 24 in the first embodiment is formed of a four-layer rubber layered body in which first rubber layers 40 and second rubber layers 41 are alternately stacked in a thick direction.

The first rubber layer 40 is formed by butt-jointing a pair of rubber plates 40a and 40b whose grain direction is the front-back direction of the dividing sheet 24. The second rubber layer 41 is formed by butt-jointing a rubber plate 41a whose grain direction is the front-back direction of the dividing sheet 24 and a rubber plate 41b whose grain direction is a circumferential direction (perpendicular to the front-back direction) of the dividing sheet 24.

The first rubber layers 40 and the second rubber layers 41 are stacked upon one another so that the butt-jointed faces of the first rubber layers 40 lay in the same plane S1, and that the rubber plates 41b of the second rubber layers 41, whose grain direction is the circumferential direction, lay in the same plane S1. The butt-jointed faces of the rubber plates 40a, 40b, 41a and 41b are adhered to each other by cure adhesion, and likewise the layered faces to each other by cure adhesion.

In the cross-section S1, the butt-jointed faces of the first rubber layers 40 in which the fibers 42 are cut and the grain direction of the rubber plates 41b of the second rubber layers 41 are orthogonal to the front-back direction of the dividing sheet 24. A portion located in the plane S1 is easy to split in the front-back direction and thus forms the brittle portion 24c.

The rubber plates 40a of the first rubber layers 40 in which fibers are aligned in the front-back direction of the dividing sheet 24 lay in the same plane S2 that coincides with the butt-jointed face of the rubber plates 41a and 41b of the second rubber layers 41. A portion between the butt-jointed faces of the first and second rubber layers 40 and 41, that is, between the planes S1 and S2, has strength required for the brittle portion because of shear stress produced by adhesion between the layered faces. As the result of the above-described configuration, the brittle portion 24c endures the combustion pressure of the first pulse and is broken at one place of the portion located in the plane S1 at the time of the second pulse.

Referring to FIG. 2, the first igniter 12 is fixed to be located in the axial portion of a dividing wall 2c that blocks the front section of the pressure vessel 2. The first igniter 12 is protruding rearwards within the internal bore of the second grain 8, namely, within the inner face 24a of the dividing sheet member 10. In the dividing wall 2c, a plurality of ignition holes 32 leading to the grain holder 22 are formed to be located at different phases. Second igniters 14 are situated so as to be connected to the ignition holes 32. The second igniters 14 have a ring-like hollow, which is loaded with ignition charge. The second igniters 14 are toroidal igniters that function to transfer the flame of the ignition charges to all the ignition holes 32 at the time of ignition of the second pulse.

The operation of the pulse rocket motor of the invention thus configured will be described below.

FIGS. 7A to 7D show the working of the pulse rocket motor of the invention. The working of the pulse rocket motor will be described with reference to these drawings. FIGS. 7A to 7D are simplified schematic views of the pulse rocket motor shown in FIGS. 1 to 5.

Figure 7A:
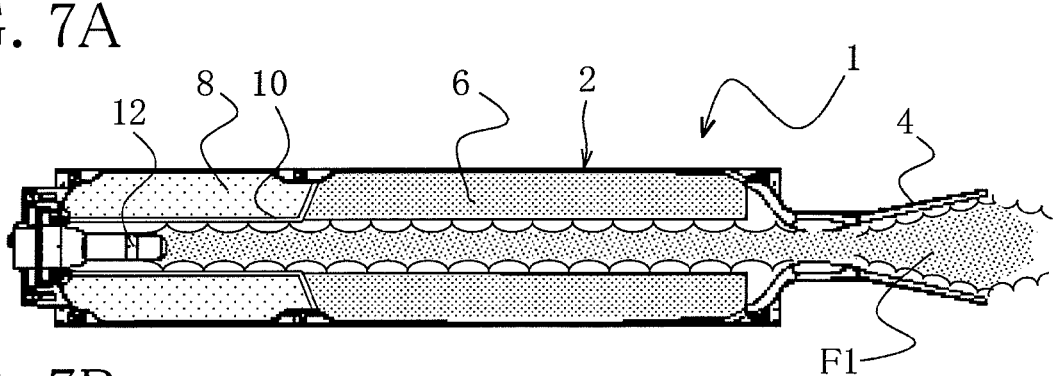
FIG. 7A is a view showing the working of the pulse rocket motor according to the invention during first pulse.

FIG. 7A shows the first pulse. When the first igniter 12 is ignited, the combustion of the first grain 6 is begun. The combustion starts from the inner circumferential surface of the internal bore of the first grain 6. Combustion gas F1 passes through the nozzle 4 and is injected into air. The dual pulse rocket motor 1 is thus provided with propulsion by the first pulse.

At this time, the ignition flame of the first igniter 12 and the combustion gas F1 of the first grain 6 do not enter into the second grain 8 because the second grain 8 is covered with the dividing sheet member 10 integrally formed to expand from the dividing sheet clamps 26a and 26b through the dividing sheet 24. Especially, the grain holder 22 having lower rigidity than the second grain 8 is provided in the axial portion of the front portion of the second grain 8. The convex portion 30a of the dividing sheet clamp 26a located at the front end of the dividing sheet member 10 extends nearer the axis in relation to the grain holder 22. For that reason, the pressure provided from the combustion gas F1 is received by the metal dividing sheet clamp 26a having sufficient strength, and thus does not deform the dividing sheet member 10.

Figure 7B:
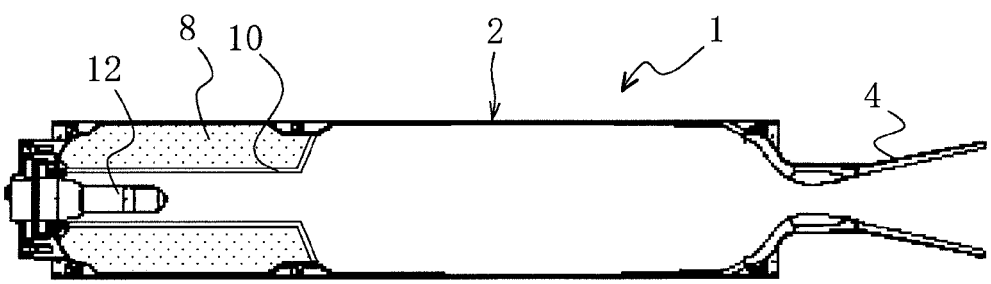
FIG. 7B is a view showing the working of the pulse rocket motor according to the invention at the time when the first pulse is finished.

As shown in FIG. 7B, when the first grain 6 is thoroughly combusted, the first pulse is finished.

Figure 7C:
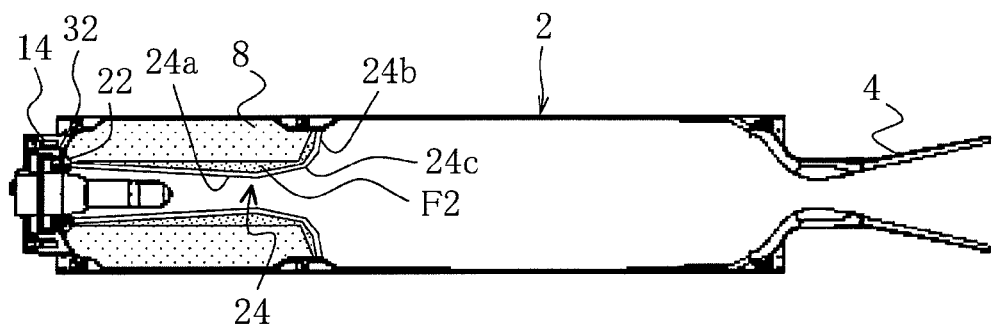
FIG. 7C is a view showing the working of the pulse rocket motor according to the invention at an initial stage of second pulse.

FIG. 7C shows the second pulse. When the second igniters 14 are ignited with arbitrary timing, the ignition fire reaches the grain holder 22 through the ignition holes 32, and the ignition holder 22 is first combusted. Once the grain holder 22 is combusted, the second grain 8 starts being combusted from the inner surface thereof towards the rear end face, and combustion gas F2 is created between the inner surface of the second grain 8 and the dividing wall member 10. The dividing sheet 24 then receives combustion pressure and expands towards the second grain 8, thereby being deformed in the inward direction of the pressure vessel 2.

Figure 7D:
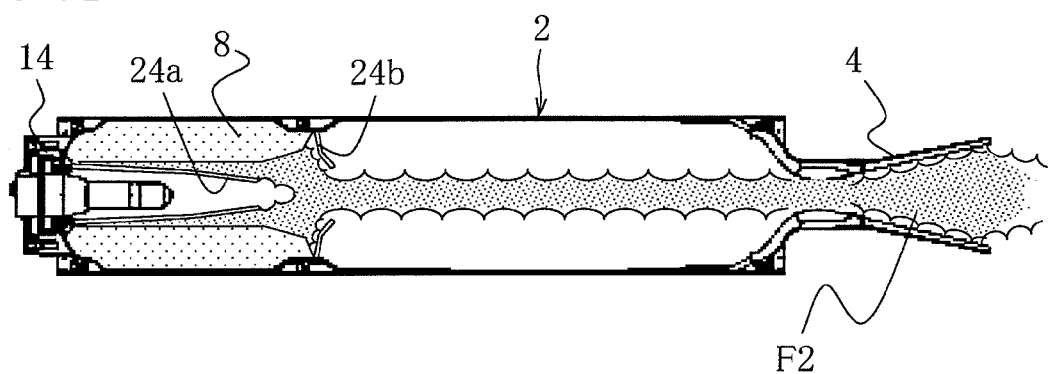
FIG. 7D is a view showing the working of the pulse rocket motor according to the invention at a late stage of the second pulse.

As shown in FIG. 7D, if the deformation of the dividing sheet 24 progresses, the dividing sheet 24 is broken in the brittle portion 24c that is more brittle than other portions. After the breakage, the combustion gas F2 passes through the nozzle 4 and is injected into air. The combustion gas F2 buckles the inner face 24a of the dividing sheet 24 towards the axis and bends the end face 24b in the rearward direction. The surfaces of the inner and end faces 24a and 24b of the dividing sheet 24 are burned off by the combustion gas F2. The dividing sheet 24 is designed to keep an unburned layer of a certain thickness in order to retain the strength that is required to avoid a harmful fall of the dividing sheet 24. The dividing sheet 24 therefore does not fall and cause a problem such as the blocking of the nozzle 4 or the like. When the second grain 8 is thoroughly combusted, the second pulse is finished.

As described above, in the dual pulse rocket motor 1 of the embodiment, the dividing sheet 24 of the dividing sheet member 10 is chemically and firmly adhered by cure adhesion to the dividing sheet clamps 26a and 26b. The dividing sheet member 10 is integrally formed to expand from the dividing sheet clamps 26a and 26b through the dividing sheet 24, thereby covering the second grain 8. This makes it possible to avoid risks including detachment attributable to aging degradation and reliably prevent the flame transfer to the second grain 8 at the time of the first pulse.

In the dividing sheet 24, the brittle portion 24c that is more brittle than other portions is formed around the curved portion between the inner face 24a and the end face 24b. Accordingly, when the dividing sheet 24 receives a combustion pressure of a predetermined or higher value at the time of the second pulse, the dividing sheet 24 is broken in the brittle portion 24c without fail.

The brittle portion 24c of the first embodiment has a configuration in which the butt-jointed faces of the first rubber layers 40 and the rubber plates 41b whose grain direction is the circumferential direction in the second rubber layers 41 are located on the same plane S1. The brittle portion 24c therefore endures the combustion pressure of the first pulse and is on the other hand broken accurately at one place of the portion located in the plane S1 at the time of the second pulse.

Since the dividing sheet 24 is credibly detached in the brittle portion 24c provided in the dividing sheet 24 of a portion covering the second grain 8, the dividing sheet 24 does not fall and block the nozzle 4. Furthermore, the dividing sheet 24, after being detached, reliably carries out the second pulse without blocking the combustion gas F2 flowing from the second grain 8. The brittle portion 24c of the dividing sheet 24 does not have to be formed in the curved portion between the inner face 24a and the end face 24b, and may be formed in an arbitrary place of the dividing sheet 24. The brittle portion 24c has a simple configuration in which the rubber layers 40 and 41 obtained by butt-jointing the rubber plates 40a, 40b, 41a and 41b are stacked in layers and adhered to each other by cure adhesion. At the same time, the brittle portion 24c enables the dividing sheet 24 to maintain integrity. This way, the brittle portion 24c is capable of preventing the flame transfer to the second grain 8 at the time of the first pulse as mentioned above.

Since the dividing sheet member 10 is attached to the pressure vessel 2 with the dividing sheet clamps 26a and 26b formed integrally with the dividing sheet 24, it is not required to adhere the dividing sheet 24 to the grains 6 and 8, which facilitates the production. Moreover, since the grains 6 and 8 do not adhere to the dividing sheet 24, the dividing sheet 24 is easily detached from the second grain 8 at the time of the second pulse, and the second pulse can be reliably carried out.

In the dividing sheet clamp 26a located near the front end, the convex portion 30a that is adhered to the dividing sheet 24 by cure adhesion extends rearwards at least over a range of the grain holder 22, so that the combustion pressure created during the first pulse is received by the metal dividing sheet clamp 26a. It is then possible to secure strength of a region of the dividing sheet member 10, which is in contact with the grain holder 22, and prevent the deformation and breakage from occurring in the region.

With this simple configuration, the dual pulse rocket motor of the first embodiment unfailingly prevents flame from being transferred to the second grain 8 at the time of the first pulse and reliably carries out the second pulse.

This is the end of the description of the pulse rocket motor of the first embodiment of the invention. However, the configuration of the brittle portion 24c of the dividing sheet 24 is not limited to the first embodiment.

For example, the dividing sheet 24 of the embodiment is formed by stacking the first and second rubber layers 40 and 41 in which the rubber plates are butt-jointed. However, the second rubber layer may be formed only of the rubber plates whose grain direction is the circumferential direction of the dividing sheet.

Although the second rubber layer 41 of the embodiment is configured by butt-jointing the rubber plate 41a whose grain direction is the front-back direction of the dividing sheet 24 and the rubber plate 41b whose grain direction is the circumferential direction of the dividing sheet 24, the grain direction of the rubber plate 41a is not limited to the front-back direction and may be another arbitrary direction.

The pulse rocket motor of the second to fifth embodiments different in the configuration of the brittle portion 24c will be described below. The pulse rocket motor of the second to fifth embodiments is the same as the pulse rocket motor 1 of the first embodiment in terms of configuration except for the brittle portion. These embodiments have the same advantages as with the first embodiment, so that detailed description will be omitted, and the configuration of the brittle portion of these embodiments will be described in detail.

Figure 8A:
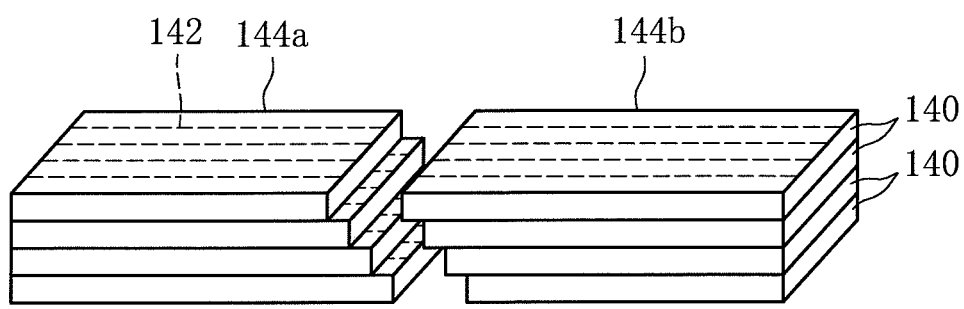
FIG. 8A is a fragmentary sectional view showing in an exploded state a configuration of a brittle portion of a dividing sheet arranged in a pulse rocket motor according to a second embodiment.
Figure 8B:
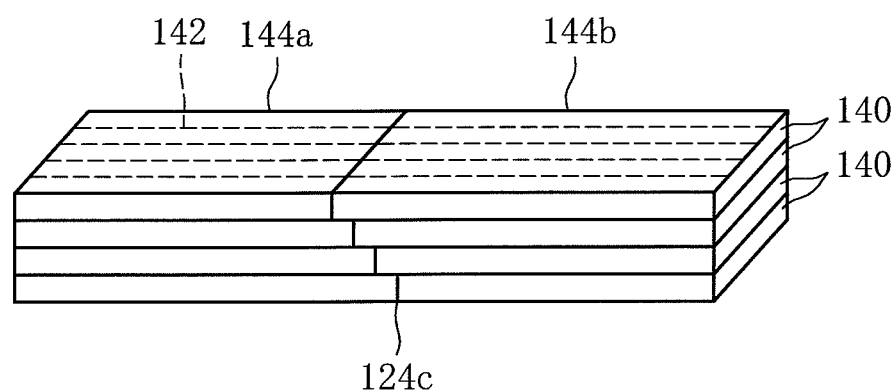
FIG. 8B is a fragmentary sectional view showing in a layered state the configuration of the brittle portion of the dividing sheet arranged in the pulse rocket motor according to the second embodiment.
Figure 8B:
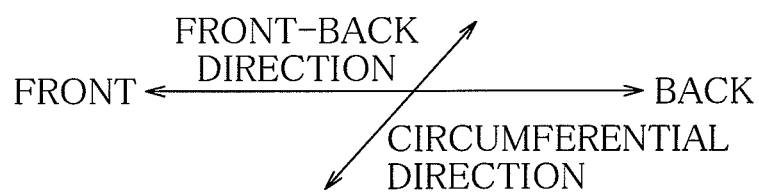

FIGS. 8A and 8B are fragmentary sectional views showing the configuration of the brittle portion of the dividing sheet in the pulse rocket motor according to the second embodiment. The second embodiment will be described with reference to FIGS. 8A and 8B.

As shown in FIGS. 8A and 8B, the dividing sheet in the second embodiment forms a front rubber layered body 144a and a rear rubber layered body 144b by stacking rubber plates 140. These two front and rear rubber layered bodies are butt-jointed together by cure adhesion. This way, the layered faces and butt-jointed faces of the rubber plates 140 are adhered together. The brittle portion 124c in the second embodiment is a portion in which a pair of front and rear rubber layered bodies, namely, the front rubber layered body 144a and the rear rubber layered body 144b forming the dividing sheet, are butt-jointed by cure adhesion. The butt-jointed faces of the front rubber layered body 144a and the rear rubber layered body 144b form a staircase pattern so as to be engaged with each other. The stair-like boundary faces adhered to each other function as the brittle portion 124c. In other words, since the front rubber layered body 144a and the rear rubber layered body 144b are butt-jointed to each other, fibers contained inside the rubber plate 140 are cut off in the adhesion boundary faces, which makes the boundary faces more brittle than other portions.

Figure 9:
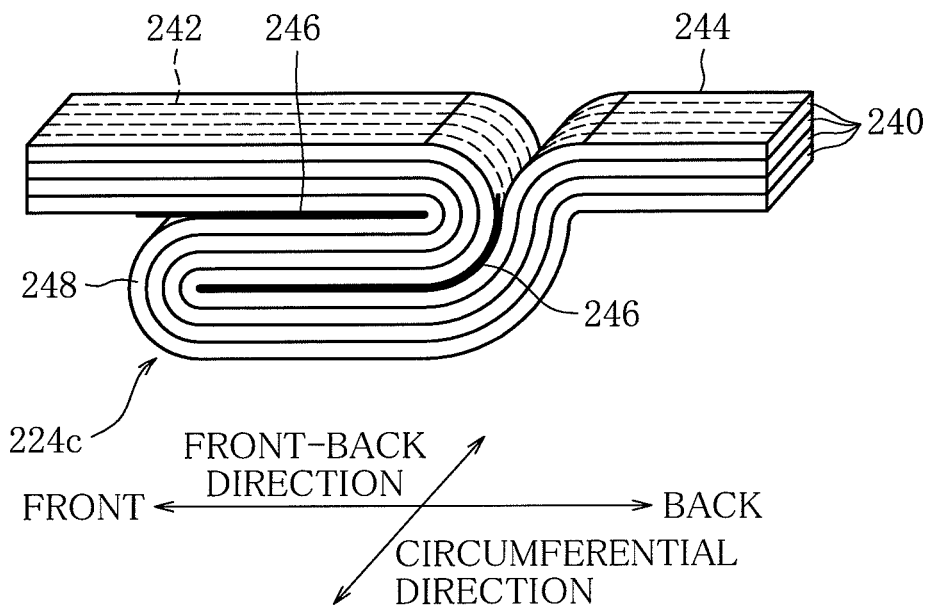
FIG. 9 is a fragmentary sectional view showing a configuration of a brittle portion of a dividing sheet arranged in a pulse rocket motor according to a third embodiment.

FIG. 9 is a fragmentary sectional view showing the configuration of the brittle portion of the dividing sheet in the pulse rocket motor according to the third embodiment. The third embodiment will be described with reference to FIG. 9.

A brittle portion 224c of the third embodiment is a portion formed by folding a rubber layered body 244 forming the dividing sheet as shown in FIG. 9.

More specifically, the rubber layered body 244 is obtained by stacking rubber plates 240 whose grain direction in which fibers 242 are aligned is the front-back direction. In the brittle portion 224c, the rubber layered body 244 is folded twice. The folded portion is projecting inwards as viewed in the inner circumferential portion of the dividing sheet. Release sheets 246 (such as fluorine resin sheet) for preventing cure adhesion between the rubber plates are sandwiched between the respective contacting faces of the folded rubber layered body 244. The folded portion is compressed and vulcanized in a thickness direction with the release sheets 246 sandwiched between the contacting faces.

When the brittle portion 224c formed of the folded portion receives the combustion pressure created during the second pulse, and the dividing sheet 24 is then stretched in the front-back direction, the portions sandwiching the release sheets 246 and thus being not adhered together start expanding. As the result, stress is focused on a curved portion 248 that is curved in an arc-like shape. When the stress reaches a predetermined or higher value, the curved portion 248 is broken.

In the brittle portion 224c of the third embodiment, the curved portion 248 on which stress is focused is formed by folding the rubber layered body 244, thereby forming the brittle portion 224c that is more brittle than other portions.

Figure 10:
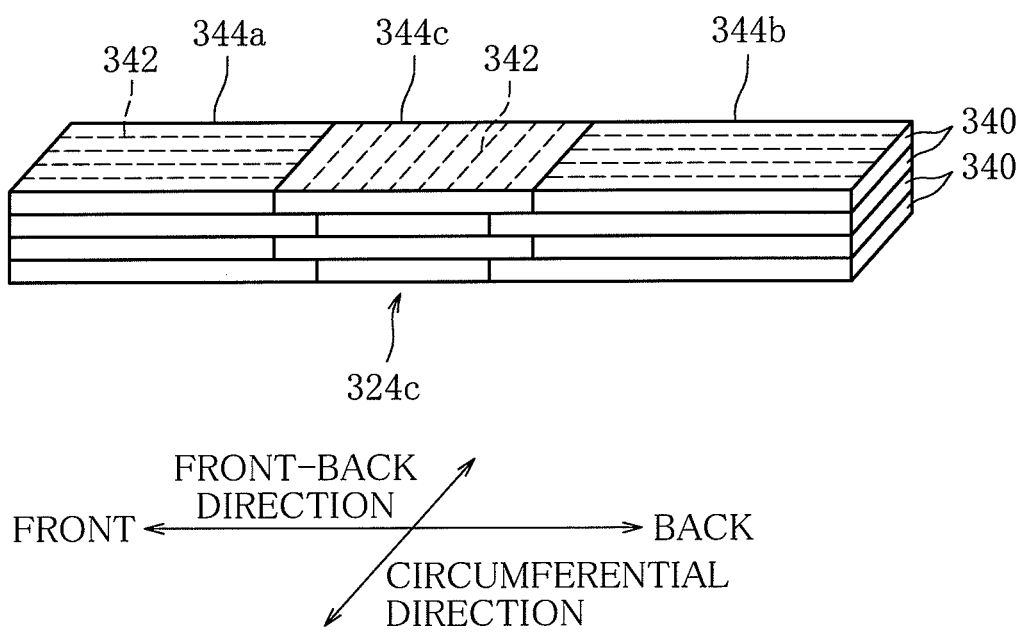
FIG. 10 is a fragmentary sectional view showing a configuration of a brittle portion of a dividing sheet arranged in a pulse rocket motor according to a fourth embodiment.

FIG. 10 is a fragmentary sectional view showing the configuration of the brittle portion of the dividing sheet in the pulse rocket motor according to the fourth embodiment. The fourth embodiment will be described with reference to FIG. 10.

As shown in FIG. 10, a brittle portion 324c of the fourth embodiment is a portion in which a rubber layered body 344c whose grain direction is a circumferential direction is sandwiched between a pair of front and rear rubber layered bodies 344a and 344b whose grain direction is the front-back direction.

More specifically, the middle rubber layered body 344c whose grain direction is the circumferential direction is situated between the front rubber layered body 344a and the rear rubber layered body 344b whose grain direction in which fibers 342 are aligned is the front-back direction. Boundary faces of the front rubber layered body 344a, the rear rubber layered body 344b and the middle rubber layered body 344c are butt-jointed together by cure adhesion. These butt-jointed boundary faces are concave-convex surfaces in which the rubber plates 340 are alternately projecting and recessed so that the rubber layered bodies 344a, 344b and 344c may be engaged with each other.

When receiving the combustion pressure created during the second pulse, the dividing sheet 24 expands in the front-back direction. The front and rear rubber layered bodies 344a and 344b whose grain direction is the front-back direction therefore have much strength against the combustion pressure. The middle rubber layered body 344c whose grain direction is the circumferential direction orthogonal to the front-back direction is sensitive to expansion in the front-back direction, and is broken along the fibers 342 ahead of the front and rear rubber layered bodies 344a and 344b. In the fourth embodiment, the brittle portion 324c that is more brittle than other portions is formed by setting the aligning direction of the fibers 342 (grain direction) contained in the rubber plates 340 to be a direction in which the fibers 342 are easily broken.

Figure 11:
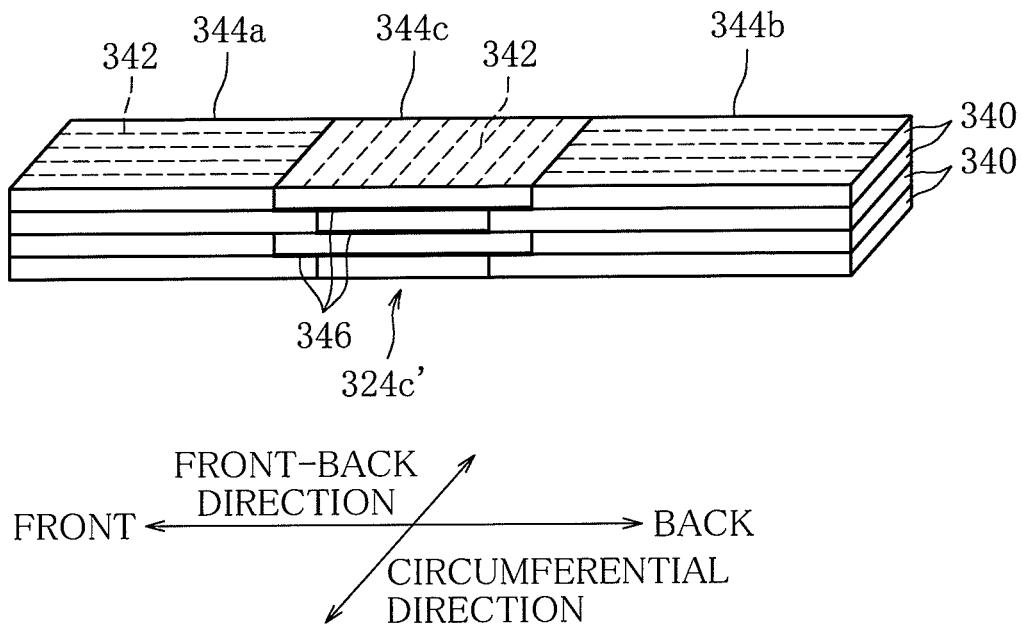
FIG. 11 is a fragmentary sectional view showing a modification example of the brittle portion shown in FIG. 10.

FIG. 11 shows a modification example of the fourth embodiment.

According to the modification example, release sheets 346 (such as fluorine resin sheet) for preventing cure adhesion between the rubber plates are sandwiched between the layered faces of the rubber plates 340 of the middle rubber layered body 344c, thereby preventing the rubber plates from being adhered to each other at the time of molding the middle rubber layered body 344c. This makes the middle rubber layered body 344c easy to break. If the release sheets 346 are used to prevent the layered faces of the rubber plates 340 from being adhered to each other, it is possible to adjust the strength of a brittle portion 324c' and break the dividing sheet with proper timing in the second pulse.

Figure 12:
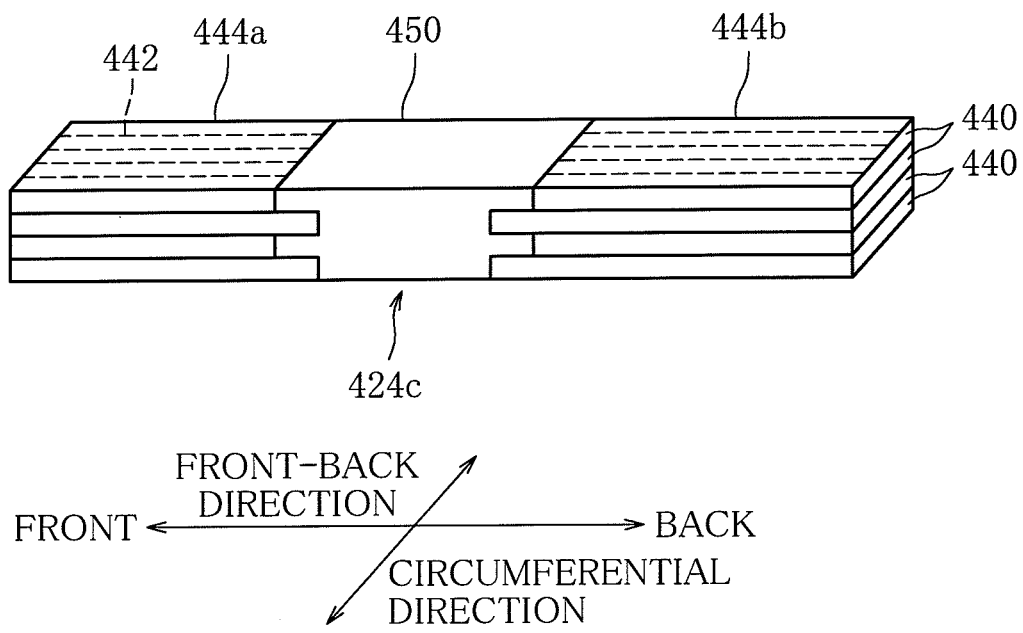
FIG. 12 is a fragmentary sectional view showing a configuration of a brittle portion of a dividing sheet arranged in a pulse rocket motor according to a fifth embodiment.

FIG. 12 is a fragmentary sectional view showing the configuration of the brittle portion of the dividing sheet in the pulse rocket motor according to the fifth embodiment. The fifth embodiment will be described with reference to FIG. 12.

As shown in FIG. 12, a brittle portion 424c of the fifth embodiment is a portion in which a pair of front and rear rubber layered bodies 444a and 444b has an intervening member 450 there between, which is made of different material from the rubber layered bodies 444a and 444b.

More specifically, the intervening member 450 is situated between the front rubber layered body 444a and the rear rubber layered body 444b whose grain direction in which fibers 442 are aligned is the front-back direction. Boundary faces of the front rubber layered body 444a, the rear rubber layered body 444b and the intervening member 450 are butt-jointed by cure adhesion. The butt-jointed boundary faces are concave-convex surfaces in which the rubber plates 440 of the rubber layered bodies 444a and 444b are alternately projecting and recessed so that the rubber layered bodies 444a and 444b and the intervening member 450 may be engaged with each other.

The intervening member 450 is made, for example, of rubber that is free of fibers or the like or heat-resistant resin (heat-resistant engineering plastic) and is made of material that is more sensitive to expansion in the front-back direction and easier to break at least than the rubber layered bodies 444a and 444b. If the dividing sheet receives the combustion pressure created during the second pulse and expands in the front-back direction, the intervening member 450 is broken ahead of the rubber layered body 444a and 444b. In other words, the brittle portion 424c of the fifth embodiment is formed to be more brittle than other portions by placing the intervening member 450 low in strength between the rubber layered bodies 444a and 444b.

This is the end of the description of the embodiments of the pulse rocket motor according to the invention. However, embodiments are not limited to the foregoing ones.

Loads of the first and second grains 6 and 8 and the like are not limited to those mentioned in the above embodiments, and may be properly determined depending on the intended use. For example, the entire first grain may be formed in the shape of a hollow cylinder or a cylinder including a portion having a cross-section with vertices.

Although the pressure vessel 2 of the embodiments is of a bi-split type, the invention may be applied to a non-splitable pressure vessel that is integrally formed into a single body.

In the above embodiments, the rubber layered body forming the dividing sheet is formed of the four rubber layers 40 and 41. The number of the rubber layers of the rubber layered body, however, is not limited and may be more or less than the foregoing number.

According to the above embodiments, the dividing sheet 24 is formed to expand from the inner face 24a of the second grain 8 through the end face 24b. However, the dividing sheet 24 is only required to expand along the inner face 24a of the second grain 8 and cover the second grain 8. For example, if the pressure vessel is provided inside with an inner wall for separating the first grain from the second grain, the dividing sheet is provided only to the inner face, which expands along the inner circumference of the second grain. The dividing sheet is then provided with dividing sheet clamps at both sides. The dividing sheet clamp located near the front end is fixed to a front dividing wall of the pressure vessel, and the dividing sheet clamp located near the rear end is fixed to the inner wall for separating the first grain from the second grain.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pulse rocket motor comprising:
   a first grain having a hollow cylinder-like shape and situated in a rear section of a pressure vessel;
   a first igniter that ignites the first grain;

a second grain having a hollow cylinder-like shape and situated in a front section of the pressure vessel;

a second igniter that ignites the second grain; and a dividing sheet member that covers the second grain within the pressure vessel, wherein:

the dividing sheet member has a dividing sheet expanding at least along an inner circumferential surface of the second grain, and holders formed integrally with the dividing sheet at both ends of the dividing sheet by cure adhesion and attached to the pressure vessel; and the dividing sheet includes a brittle portion that expands along the inner circumferential surface of the second grain through a rear end face of the second grain and is more brittle than other portions.

2. The pulse rocket motor according to claim 1, wherein:
the dividing sheet is curved along an inner circumferential surface of the second grain through the rear end face of the second grain, and the brittle portion is formed around the curved portion.

3. The pulse rocket motor according to claim 1, wherein:
the dividing sheet is a rubber layered body in which rubber plates containing fibers are stacked in layers in a thickness direction; and the brittle portion is a portion in which first rubber layers, each of which includes a pair of butt-jointed rubber plates whose grain direction is a front-back direction of the dividing sheet member, and second rubber layers, each of which includes butt-jointed a rubber plate whose grain direction is an arbitrary direction and a rubber plate whose grain direction is a circumferential direction of the dividing sheet member, are alternately stacked in layers; butt-jointed faces of the first rubber layers lay in the same plane; and the rubber plate lay in the same plane whose grain direction, except for the grain direction of the butt-jointed faces, is the circumferential direction of the dividing sheet member.

4. The pulse rocket motor according to claim 1, wherein:
the dividing sheet is a rubber layered body in which rubber plates are stacked in layers in a thickness direction; and the brittle portion is a portion in which the front and rear rubber layered bodies are butt-jointed together by cure adhesion.

5. The pulse rocket motor according to claim 1, wherein:
the dividing sheet is a rubber layered body in which rubber plates are stacked in layers in a thickness direction; and the brittle portion is a portion in which the rubber layered body is folded.

6. The pulse rocket motor according to claim 1, wherein:
the dividing sheet is a rubber layered body in which rubber plates in which fibers are mixed and aligned in a grain direction are stacked in layers in a thickness direction; and the brittle portion is a portion in which a rubber layered body obtained by stacking rubber plates whose grain direction is a circumferential direction of the dividing sheet member is sandwiched between front and rear rubber layered bodies in which rubber plates whose grain direction is a front-back direction of the dividing sheet member are stacked in layers.

7. The pulse rocket motor according to claim 6, wherein:
in the rubber layered body obtained by stacking the rubber plates whose grain direction is the circumferential direction of the dividing sheet member, layered faces of the rubber plates are not adhered to each other.

8. The pulse rocket motor according to claim 1, wherein:
the dividing sheet is a rubber layered body in which rubber plates are stacked in layers in a thickness direction; and the brittle portion is a portion in which a pair of front and rear rubber layered bodies has an intervening member there between, which is made of material different from the rubber layered bodies.

* * * * *